United States Patent [19]

Erickson et al.

[11] Patent Number: 5,023,312

[45] Date of Patent: Jun. 11, 1991

[54] MEADOWFOAM OIL AND MEADOWFOAM OIL DERIVATIVES AS LUBRICANT ADDITIVES

[76] Inventors: Frank L. Erickson, 1461 SW. 152nd St., Seattle, Wash. 98166; Robert E. Anderson, 355 S. Madison, Apt. 322, Pasadena, Calif. 91101; Phillip S. Landis, 5753 Independence Cir., Alexandria, Va. 22312

[21] Appl. No.: 510,942

[22] Filed: Apr. 19, 1990

Related U.S. Application Data

[62] Division of Ser. No. 221,061, Jul. 19, 1988, Pat. No. 4,925,581.

[51] Int. Cl.$^5$ ............................................... C07F 9/02
[52] U.S. Cl. ................................. 558/160; 252/49.8
[58] Field of Search ..................... 558/160; 252/49.8

[56] References Cited

U.S. PATENT DOCUMENTS

| | | | |
|---|---|---|---|
| 2,339,798 | 1/1944 | Musher | 252/49.8 |
| 2,989,562 | 6/1961 | Swern et al. | 558/160 |
| 3,189,628 | 6/1965 | Knight et al. | 558/160 |
| 4,925,581 | 5/1990 | Erickson et al. | 252/48.2 |

*Primary Examiner*—Olik Chaudhuri
*Assistant Examiner*—Jerry D. Johnson
*Attorney, Agent, or Firm*—Davis Wright Tremaine

[57] ABSTRACT

There is disclosed lubricant additives that comprise a combination of meadowfoam oil as a triglyceride or a wax ester, sulfurized triglyceride meadowfoam oil or sulfurized wax ester of meadowfoam oil, amnd phosphite adducts of triglyceride meadowfoam oil or wax ester of meadowfoam oil. There is also disclosed a process for sulfurizing triglyceride meadowfoam oil that is soluble in a lubricant base, such as mineral oil.

4 Claims, 2 Drawing Sheets

MEADOWFOAM OIL (Unrefined)

| | From Complete Seed | From Dehulled Seed |
|---|---|---|
| CHEMICAL PROPERTIES | | |
| Fatty Acid Composition of the triglycerides | | |
| 20:1 Δ5 | 62.6% | 62.8% |
| 22:1 Δ5 | 2.6 | 2.4 |
| 22:1 Δ13 | 9.7 | 10.0 |
| 22:2 Δ5, 13 | 22.1 | 21.8 |
| All Others | 3.0 | 3.0 |
| Iodine Value+ | 87 | — |
| Saponification Number+++ | 168 | 178 |
| Peroxide Value | 3.77 | 3.66 |
| PHYSICAL PROPERTIES | | |
| Melting Point+ | −1 to 7°C | — |
| Viscosity (Centipoises) | 43 | 41 |
| Density @23°C | 0.915g/ml | 0.909g/ml |
| Refractive Index η23/D | 1.4738 | 1.4730 |
| Color (amber) (absorbance @450nm, 20 mg/ml) | 0.426 | 0.211 |
| Flash Point | 257-270°C | |
| TRACE CONSTITUENTS | | |
| Free Fatty Acids | 0.78% | 0.68% |
| Phosphorus | 266ppm | 232ppm |
| Sulfur | 800ppm | 200ppm |
| Iron | <0.5ppm | <0.5ppm |
| Copper | <0.5ppm | <0.5ppm |

FIG. 1A

FATTY ACIDS (Split from triglycerides)

| | |
|---|---|
| Melting Point+ | 18 to 22°C |
| Viscosity (Centipoises)+ | 38 |
| Density @23°C | 0.882 g/ml |
| Refractive Index $\eta 23/D$ | 1.4645 |

DERIVED LIQUID WAX ESTERS

| | |
|---|---|
| Ester Content (By calculation) | |
| C40 (mole %) | 44.1% |
| C42 | 37.2% |
| C44 | 18.6% |
| Melting Point+ | 3 to 5°C |
| Viscosity (Centipoises)+ | 33 |
| Density +@25°C | 0.866 g/ml |
| Refractive Index+ $\eta 25/D$ | 1.4656 |

MEADOWFOAM MEAL, PROXIMATE ANALYSIS

| | |
|---|---|
| Moisture | 5.4% / 5.3% |
| Crude Protein* | 23.4% / 35.7% |
| Acid Detergent Fiber* | 27.8% / 12.8% |
| Ash* | 9.4% / 9.0% |
| Crude Fat* | 0.7% / 2.6% |

FIG. 1B

+ Literature Value
++ Calculated Value
* Dry weight basis

MEADOWFOAM OIL AND MEADOWFOAM OIL DERIVATIVES AS LUBRICANT ADDITIVES

This application is a divisional of Ser. No. 221,061 filed on July 19, 1988, now U.S. Pat. No. 4,925,581.

1. Technical Field

The present invention relates to lubricant compositions and lubricant additives and to methods for producing lubricant additives with antifriction properties that contain meadowfoam oil and meadowfoam oil derivatives as lubricating agents. More specifically, this invention relates to wax esters of meadowfoam oil fatty acids, sulfurized meadowfoam oil triglycerides, sulfurized meadowfoam oil wax esters, meadowfoam oil triglycerides, phosphite adducts of meadowfoam oil triglycerides, and phosphite adducts of meadowfoam oil wax esters as lubricant additives in various combinations.

2. Background of the Invention

Meadowfoam (*Limnanthes laba*) is a herbaceous winter annual plant native to the Pacific Northwest region of the U.S. The common name "meadowfoam" was given because of the appearance of its solid canopy of creamy white flowers at full bloom. Meadowfoam is currently being grown commercially in Oregon's Willamette Valley.

Meadowfoam oil is a triglyceride oil that is extracted from meadowfoam seeds. Meadowfoam seeds are pear-shaped, consisting of a thin, brown, striated hull surrounding a relatively soft, light-colored dicotyledon kernel. The seeds, measuring about 2×3 mm, average about 150 to the gram. The kernels contribute about two-thirds of the total weight and contain essentially all of the triglyceride oil. Commercial meadowfoam seeds generally contain about 27% oil. The physical and chemical properties of meadowfoam oil are shown in FIG. 1.

Lubricants are widely used to reduce the friction between the surfaces of moving parts and thereby reduce the wear and prevent damage to the parts. Most lubricants are comprised principally of a base stock which is generally a relatively high molecular weight hydrocarbon. In applications where the amount of pressure applied to the moving part is quite high, lubricants which are comprised of only hydrocarbon base stock tend to fail and the contacting parts are damaged. It is well known to add materials (lubricant additives) to increase the high pressure performance of lubricants. These materials are generally called "extreme pressure additives." Examples of extreme pressure additives are sulfurized materials such as sulfurized sperm whale oil or sulfurized jojoba oil.

Meadowfoam oil is a triglyceride with approximately 95% of the falty acids being $C_{20}$ and $C_{22}$ fatty acids and primarily monoenoic (single unsaturation). Further, there is a lack of conjugation of even the dienoic fatty acids, as the double bonds are located far from each other. This amount of unsaturation provides for greater oxidative stability than is found in conjugated, unsaturated fatty acids. Meadowfoam oil is a triglyceride in which the α- and α'-positions are most often occupied by 5' monoenoic acids and the major fatty acids are: 5-eicosenoic, 11-eicosenoic, 5-docosenoic, 13-docosenoic, and 5,13-docosadienoic acids.

Wax esters can be sulfurized from natural wax esters, such as from jojoba oil, and from synthesized wax esters, such as from vegetable oil triglycerides and liberated fatty acids. Natural wax esters have produced formulated sulfurized products that provide effective lubricant additive compositions. However, the problems with the natural wax esters are availability and cost. The vegetable oils have to be transesterified from the free fatty acids to produce the wax esters. For practical applications, however, the vegetable oil triglycerides have the disadvantage that cost-adding conversion steps are necessary to form a wax ester for sulfurization, rather than a direct sulfurization of the triglyceride. These extra processing steps make vegetable oil wax esters relatively uneconomical as lubricant additives.

Princen et al., "Development of New Crops for Industrial Raw Materials," *J. Amer. Oil Chemists Soc.*, 61:281-89, 1984, tried to sulfurize meadowfoam oil by sulfurizing the wax esters of the meadowfoam fatty acids. Princen et al. found that sulfurization of the unaltered triglyceride oil can react with sulfur under traditional sulfurization conditions to yield factice, a solid chemical rubber and an unacceptable lubricant additive. The first sulfurized wax ester of meadowfoam oil preparation in Princen et al. had good lubrication properties, but it corroded copper, foamed excessively, and thickened excessively under in-use conditions in a hot gear box. The second sulfurized wax ester of meadowfoam oil preparation in Princen et al. was made with different synthesis conditions, but the second preparation decreased copper corrosion and maintained lubricating properties but produced more foam and did not meet a thermal stability test. The third preparation in Princen et al. used wax esters from enriched monoene and diene acids. The diene wax ester (made from monoenoic fatty acids) resulted in increased wear scar but favorable other properties.

Wakim, U.S. Pat. No. 3,986,966 after demonstrating that sulfurization of triglycerides alone gave resinous products mostly insoluble in base oils, added nonwax methyl esters of a fatty acid of 18 to 22 carbon atoms which are monounsaturated to improve the solubility of the sulfurized triglycerides.

Hutchinson et al., U.S. Pat. No. 3,740,333 refers to sulfurized blends of lard oil and a saturated wax ester, the essential element of the wax ester being derived from a $C_{10-16}$ saturated alcohol and a $C_{18-22}$ unsaturated acid.

Kammann et al., "Sulfurized Vegetable Oil Products as Lubricant Additives," *J. Amer. Oil Chemists Soc.*, 62:917-23, 1985, found that sulfurized vegetable triglyceride oils resulted in rubbery products, in some cases even at a 12% sulfur content. Kammann et al. tried using sulfurization with large amounts of methyl lardate, but obtained factice or near factice with meadowfoam oil. Kammann et al. was able to sulfurize only by adding 10% unsaturated oleic acid before sulfurization; however, the resulting product properties were undesirable as a lubricant additive.

There are many problems using a sulfurized meadowfoam oil. Therefore, there exists a need in the art to find lubricant additive compositions that can use the relatively abundant supplies of meadowfoam oil without resorting to the multiple processing steps of making wax esters of the fatty acids. There further exists a need in the, art to be able to sulfurize meadowfoam oil in the triglyceride state for use as a lubricant additive.

SUMMARY OF THE INVENTION

Briefly stated, the present invention encompasses lubricant additives comprising combinations of meadowfoam oil with at least one of sulfurized meadowfoam oil and a phosphite adduct of meadowfoam oil. The meadowfoam oil can be in the form of the native triglyceride or as a meadowfoam wax ester. The sulfurized meadowfoam oil comprises either a sulfurized mixture of the triglyceride form of meadowfoam oil with from about 25% to about 75% of a wax ester or sulfurized meadowfoam wax ester. The wax ester is jojoba oil or is derived from a $C_{18-22}$ unsaturated acid and a $C_{18-22}$ unsaturated alcohol. Preferably, the wax ester is a naturally occurring wax ester, such as jojoba oil, or the wax ester of meadowfoam oil. The phosphite adduct of meadowfoam oil can be a mono- through hexa-adduct of the triglyceride form of meadowfoam oil, or a mono- through tetra-adduct of the wax ester form of meadowfoam oil.

The phosphite adduct of meadowfoam oil is formed by the reaction of triglyceride meadowfoam oil or wax ester of meadowfoam oil and a compound of the formula:

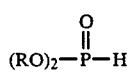

wherein R is H, $C_{1-12}$ alkyl, $C_{1-12}$ aryl, $C_{1-12}$ alkaryl, $C_{1-12}$ aralkyl, and cyclo $C_{4-12}$ alkyl. Preferably, R is $C_{4-8}$ alkyl, $C_{4-8}$ alkaryl, $C_{4-8}$ aralkyl, or cyclo $C_{4-8}$ alkyl. Most preferably, R is n-butyl.

The present invention further comprises a lubricating composition consisting essentially of a lubricant base and a lubricant additive wherein the lubricant additive comprises a mixture of at least two ingredients from different classes of ingredients selected from the group consisting of three classes of ingredients:

wherein the first class of ingredients comprises a triglyceride meadowfoam oil, a wax ester of meadowfoam oil, and a combination thereof;

wherein the second class of ingredients comprises: a sulfurized meadowfoam oil wax ester; a sulfurized triglyceride meadowfoam oil within the range of from about 25% to about 75% meadowfoam oil, and from about 25% to about 75% of a wax ester; and a combination thereof; and wherein the third class of ingredients comprises a phosphite adduct of triglyceride meadowfoam oil, a phosphite adduct of meadowfoam oil wax ester, and a combination thereof.

BRIEF DESCRIPTION OF THE DRAWINGS

FIG. 1 shows the chemical properties of meadowfoam oil, including a breakdown of the distribution of the fatty acids found in the native triglyceride state.

DETAILED DESCRIPTION OF THE INVENTION

The present invention is a lubricant with antifriction properties, including antiwear and load-carrying properties, and comprising a lubricant base and a lubricating additive. The lubricant base stock can be selected from a large class of compounds. Most often the base is a high molecular weight hydrocarbon. The lubricant base is, preferably, a mineral oil, although synthetic hydrocarbon lubricating oils and other synthetic lubricating oils, such as ester lubricating oils and mixtures thereof (e.g., mixtures of mineral and synthetic lubricating oils), can also be used, provided that the desired proportion of lubricating additive is soluble in the lubricant base. The mineral oils include HVI (high viscosity index) oils, Bright Stock, and Bright Stock extract as well as MVI and LVI oils. The viscosity index of these oils can vary from −150 to 150. The 210° F. viscosities of these oils can vary from 2 to 140 centistokes. Mixtures of these oils are also suitably employed.

Examples of lubricant bases include hydrocarbon oil; synthetic hydrocarbon; an ester-based lubricant; a mineral oil; a mixture of a mineral oil and an ester-based lubricant; a mixture of mineral oil, synthetic hydrocarbon, and an ester-based lubricant; a mineral oil-based grease; and a synthetic hydrocarbon-based grease. Specifically, the base fluids are:

a. mineral oils, such as paraffinic neutral 100″, furfural-refined paraffinic oil, solvent-refined napthenic oil, and solvent-refined aromatic oil;

b. synthetic hydrocarbon oils, such as hydrogenated or partially hydrogenated polydecene and other olefins, hydrogenated hexene oligomer, hydrogenated octene oligomer, hydrogenated decene oligomer, hydrogenated $C_{6-10}$ oligomer, and hydrogenated $C_{8-10}$ oligomer;

c. ester fluids, such as pentaerylhritol esters having the structures:

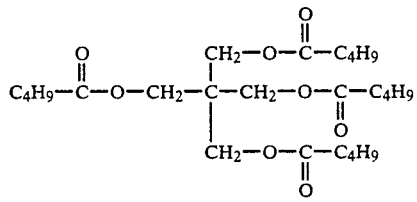

and

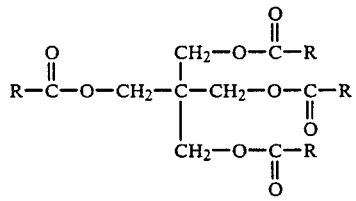

wherein R is $C_4H_9$, $C_6H_{13}$, $C_8H_{17}$, or mixtures thereof; esters of trimethylolpropane and dipentaerythritol of the structures:

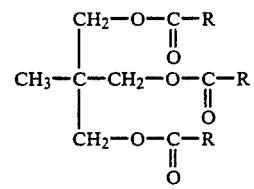

and

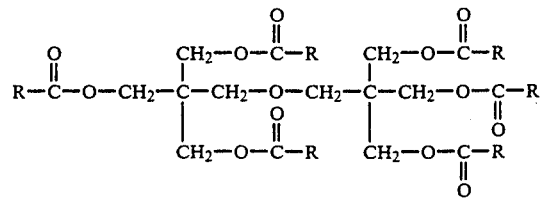

wherein R is defined as above; di-2-ethylhexyladipate; di-2-ethylhexylsebacate; didecyladipate; and didecylsebacate;

d. dialkylbenzenes, such as didocecylbenzene;

e. polyglycols, such as UCON fluids, polypropylene glycols of 1000 to 3000 molecular weight and polyethylene glycols of 1000 to 3000 molecular weight;

f. alkylaromatics; and g. dicarboxylic acids.

The lubricating additives of the present invention can be used with a variety of lubricating compositions, such as cutting fluids, precoat oils, metal-working oils, ATFs (automatic transmission fluids), gear oils, way lubricants, greases, aviation oils, textile lubricants, hydraulic oils, circulating oils, steam cylinder oils, spindle oils, fire-resistant fluids, and automotive and marine oils.

Meadowfoam oil is a tri-ester of three long chain unsaturate a tri-hydroxy alcohol. Jojoba oil, by contrast, is a monoester of a long chain unsaturated acid and a long chain unsaturated alcohol. Further, meadowfoam oil contains about 20% diene in the acid portion of the molecule. An example of this diene structure is 5,13-Docosadienoate ester of glycerol:

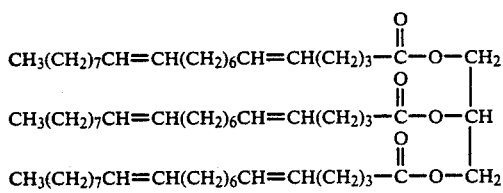

The diene structure is believed to be the major cause for problems in sulfurizing meadowfoam oil to a soluble product, particularly when high levels (>10% sulfur) are used, due to cross-linking. For example, when triglyceride meadowfoam oil is sulfurized for two hours at 180° C., using 20 weight percent of sulfur using standard procedures, the resulting product is incompletely soluble in a hydrocarbon oil. This result is consistent with published observations of sulfurizing triglyceride meadowfoam oil (see Kammann et al. supra).

The sulfurized meadowfoam oils of the present invention are completely soluble in hydrocarbon and comprise from about 25% to about 75% of meadowfoam oil in the triglyceride form and from about 75% to about 25% of a wax ester, wherein the wax ester is jojoba oil or is derived from a $C_{18-22}$ unsaturated acid and a $C_{18-22}$ unsaturated alcohol. Preferably, the wax ester is jojoba oil or a wax ester of meadowfoam oil. The combination of triglyceride meadowfoam oil and jojoba oil or a long chain wax ester can be sulfurized at high sulfur concentrations, such as 20 weight percent of sulfur. For example, Table 1 illustrates the solubility and copper strip test results of sulfurized combinations of triglyceride meadowfoam oil and jojoba oil.

TABLE 1

| | Sulfurized Combinations of Meadowfoam Oil and Jojoba Oil | | | |
|---|---|---|---|---|
| Run # | Oil (grams) | Sulfur (grams) | Solubility in 5% Mineral Oil | Copper Strip Test |
| 1. | 20 jojoba oil | 4 | soluble | 2B |
| 2. | 20 meadowfoam oil | 4 | insoluble | — |
| 3. | 20 meadowfoam oil | 3 | hazy | 3C |
| 4. | 15 jojoba oil + 5 meadowfoam oil | 4 | soluble | 2A |
| 5. | 10 jojoba oil + 10 meadowfoam oil | 4 | soluble | 2A |
| 6. | 5 jojoba oil + 15 meadowfoam oil | 4 | soluble | 1B |

The copper strip test is graded as follows: 1A, 1B, 2A and 2B are bright copper; 3A, 3B and 3C are stained copper; 4A and 4B are purple stained copper; and 5A and 5B are black copper.

The triglyceride form of meadowfoam oil has at least two double bonds in each molecule. When there are two double bonds in the same molecule, as for example in meadowfoam oil or rapeseed oil or soya bean oil, the result on sulfurization is to produce a solid or very viscous product with limited solubility in hydrocarbon oils. Such a solid or very viscous product would not be an acceptable lubricant additive. The solid or very viscous product is formed due to cross-linking with sulfur and each other, such that some molecules may be produced which have large quantities of sulfur and small amounts of solubilizing ester or glyceride. The preferred wax ester for adding to triglyceride meadowfoam oil for sulfurizing, jojoba oil, also has two double bonds in the same molecule. Thus, one would expect that jojoba oil would behave similarly to meadowfoam oil, rapeseed oil or soya bean oil and produce an insoluble product upon sulfurization.

Contrary to expectations, jojoba oil appears to be reacting with an intermediate to provide a solubilizing effect of the final product in hydrocarbon oils. A comparison of the sulfurized product of U.S. Pat. No. 3,986,966 with a saturated nonwax ester and the present invention with a wax ester (e.g., jojoba oil) and a triglyceride (rapeseed oil or meadowfoam oil) is as follows:

TABLE 2

| | $C_{14-15}$ Alkyl Oleate TABLE V of U.S. Pat. No. 3,986,966 | Jojoba Oil |
|---|---|---|
| Alcohol portion of ester | 14–15 (saturated) | 20–22 (unsaturated) |
| Fatty oil | Rapeseed | Meadowfoam |
| Ester/oil ratio | 1.22:1 | 1.22:1 |
| Sulfur, wt. % | 9.5 | 17.7 |
| Viscosity at 100° F. SVS | 2075 | 1189 |
| Copper corrosion 3 hrs. at 212° F. | 1B | 1A |
| Solubility | cloudy | clear |

Despite the use of a molecule with two double bonds, the inventive combination for sulfurizing, provide a product with superior solubility characteristics in hydrocarbon oil.

Triglyceride meadowfoam oil can be converted to the wax ester form by a process of treating the triglyceride with LiAlH$_4$ or another reducing agent into meadowfoam alcohols, such as:

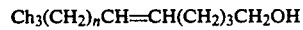

wherein n is 13 or 15 and glycerol is a by-product. The meadowfoam alcohols are added to the triglyceride meadowfoam oil in the presence of acid and heat to form more glycerol as a by-product and a meadowfoam wax ester:

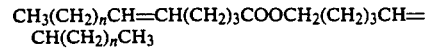

wherein n is 13 or 15. Meadowfoam wax ester is structurally analogous to jojoba oil (except for the location of the double bonds) and is a mixture of long chain esters with 40 to 44 carbon atoms. As a structural analog to jojoba oil, meadowfoam wax esters have similar chemical properties to jojoba oil.

Many sulfurized wax esters of meadowfoam oil may be used in the lubricant additives of the present invention. A preferred sulfurized wax ester of meadowfoam oil is the product of a reaction of meadowfoam oil and 10% to 20% sulfur to yield the following:

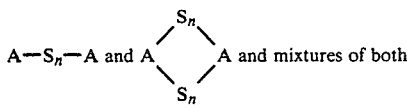

wherein n is an integer from 1 to 3, and A refers to the meadowfoam wax ester.

For example, twenty grams of meadowfoam wax ester was sulfurized with 4 grams of sulfur at 180° C. for 2 hours under nitrogen with stirring. The resulting sulfurized meadowfoam wax ester was soluble at a 5% concentration in mineral oil and had a 2B score in the copper strip test. Similarly, 20 grams of meadowfoam wax ester sulfurized in the same conditions with 3 grams of sulfur was soluble at a 5% concentration in mineral oil and had a 2A score in the copper strip test.

The phosphite adduct of meadowfoam oil is formed by the reaction of triglyceride meadowfoam oil or wax ester of meadowfoam oil and a compound of the formula:

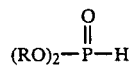

wherein R is H, $C_{1-12}$ alkyl, $C_{1-12}$ aryl, $C_{1-12}$ alkaryl, $C_{1-12}$ aralkyl, and cyclo $C_{1-12}$ alkyl. Preferably, R is $C_{4-8}$ alkyl, $C_{4-8}$ alkaryl, $C_{4-8}$ aralkyl, or cyclo $C_{4-8}$ alkyl. Most preferably, R is n-butyl.

As may be seen from its structural formula, meadowfoam oil wax ester has either two, three, or four carbon-carbon double bonds. Accordingly, the phosphite adduct of the wax ester of meadowfoam oil can be either a di-adduct, a tri-adduct, or a tetra-adduct of the wax ester of meadowfoam oil. The triglyceride form of native meadowfoam oil can have between three and six carbon-carbon double bonds within the three fatty acids on the glycerol backbone. Therefore, depending upon the amount of phosphite added as a reactant for the triglyceride meadowfoam oil, the phosphite adduct of triglyceride meadowfoam oil can be a mono-, di-, tri-, tetra-, penta-, or a hexa-adduct. The penta-adduct should be a rare species and the hexa-adduct an extremely rare species according to Poisson distribution probabilities, because the frequency of dienes among the meadowfoam oil fatty acids is only approximately 20%. Thus, the tri-adduct should be the most common species. The preferred products are the mono-, di-, and tri-adducts.

The following are examples of species of the phosphite adduct of meadowfoam oil wax ester:

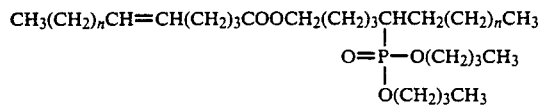

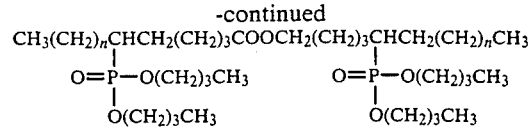

wherein n is 13 or 15.

The following are examples of species of the phosphite adduct of meadowfoam triglyceride:

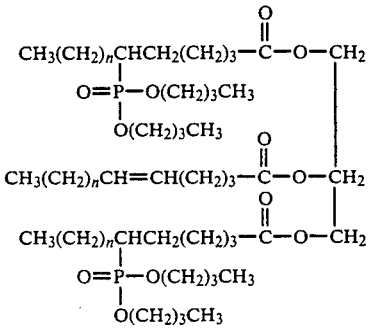

and

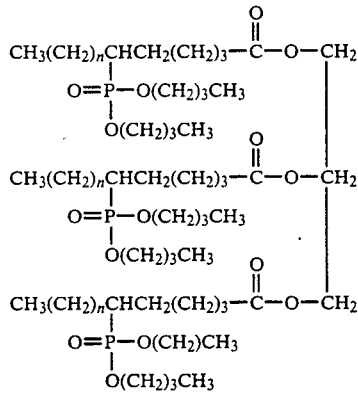

wherein n is 13 or 15.

The present invention relates to lubricating compositions, containing a lubricant additive. Depending upon the application and the desired extent of antiwear protection, the total additive concentration will range from 0.1% to 25% by weight. The lubricant additive comprises a combination of meadowfoam oil as the triglyceride or wax ester or a combination of both and at least one of a sulfurized meadowfoam oil, as described herein, and/or a phosphite adduct of meadowfoam oil as either the wax ester or the triglyceride or a combination of both, as described herein. Preferably, the lubricant additive comprises meadowfoam oil as a triglyceride, meadowfoam oil triglyceride in combination with jojoba oil and sulfurized, and the phosphite adduct of meadowfoam oil triglyceride.

Depending upon the application of the final lubricant product and the desired extent of antiwear protection desired, the total lubricant additive concentration will vary from about 0.1% to about 10% by weight. For example, a typical lubricant additive will contain about 0.1% to about 5.0% of triglyceride meadowfoam oil, wax ester meadowfoam oil or a combination of both; about 0.2% to about 10.0% of sulfurized meadowfoam oil as defined herein; from about 0.1% to about 5.0% of the phosphite adduct of meadowfoam oil as defined herein. Preferably, the phosphite adduct of meadowfoam oil is a monoadduct of dibutylphosphite of triglyceride meadowfoam oil.

Different combinations and concentrations of the lubricant additive components will depend upon the desired product attributes. For example, a hydraulic oil would have a lubricant additive comprising (percentages are by weight of total product) a relatively low concentration of sulfurized meadowfoam oil (as defined herein) of about 0.1% to about 0.5%, a relatively high concentration of meadowfoam oil (approximately 2%) and a relatively low concentration of the phosphite adduct of meadowfoam oil (as defined herein) of approximately 0.5%. A metal cutting oil, for example, would have a lubricant additive comprising (percentages are by weight of total product) approximately 7% sulfurized meadowfoam oil (as defined herein), and approximately 2% of meadowfoam oil and optionally approximately 0.5% of a phosphite adduct of meadowfoam oil (as defined herein). An automotive engine oil, for example, would contain a lubricant additive comprising (percentages are by weight of total product) approximately 1% sulfurized meadowfoam oil (as defined herein) approximately 2% of meadowfoam oil, approximately 0.5% of the phosphite adduct of meadowfoam oil (as defined herein) and other additives as are normally used in an automotive engine oil.

The following example illustrates test model performance results from standard test including the 4-ball Wear Test and the Falex Wear Test. The 4-ball Wear Test assesses extreme pressure properties of the lubricant. The measurement of friction as related to rolling, drawing, and other metal-working operations depends upon the surface of the tool and workpiece and the viscosity and chemical makeup of the lubricant, as well as the pressure and temperature developed during processing. The 4-ball wear test machine provides, under controlled testing conditions, a procedure for measuring friction. The machine consists of three balls touching each other and clamped together in a horizontal plane. A fourth ball touches three clamped balls by being positioned between the three and is driven by a motor so that it revolves in contact with the clamped balls. The rotation takes place within a reservoir containing a test lubricant. A temperature-measuring device, as well as a heater, provides a method for controlling the temperature of the test fluid. The rotating ball is loaded and then rotated for a specific time at a specific speed. At the conclusion of the test, the scar patterns developed on the balls are measured. Any stains are observed, the diameter of the scar is measured, and the coefficient of friction is calculated by dividing the tangential force by the normal force at the ball surface.

The Falex test consists of a method for measuring the torque and friction developed during rotation of a pin between two stationary V blocks. The pin as well as the V blocks can be made of various materials. The temperature of the lubricant bath into which the pin and V block are placed may also be varied. The load is applied by a ratchet arrangement. Wear measurements made above the transition pressure, that is, the load at which the lubricant film breaks down, can be a useful parameter if carried out under conditions comparable to actual operations.

EXAMPLE 1

This example illustrates 4-ball and Falex Wear Test results for a 100 SUS solvent paraffinic mineral oil base fluid without a lubricant additive and with different lubricant additives as indicated. This example compares the model test system properties of lubricant additives composed of one component as compared with lubricant additives composed of two or three components.

TABLE 3

| Lubricant | 4-Ball Wear Wear Scar Dia. (mm) | 4-Ball Wear Load (lbs) | Falex lbs to Failure |
|---|---|---|---|
| Base fluid | 0.94 | 120 | 725 |
| Base fluid + 1% meadowfoam oil | 0.82 | 150 | 2600 |
| Base fluid + 2% sulfurized meadowfoam oil[a] | 0.55 | 210 | 4200 |
| Base fluid + 1% meadowfoam phosphite adduct[b] | 0.55 | 210 | 4200 |
| Base fluid + 2% sulfurized meadowfoam oil[a] + 0.5% meadowfoam phosphite adduct[b] | 0.42 | 280 | 4500 |
| Base fluid + 1% meadowfoam oil + 1% sulfurized meadowfoam oil[a] + 0.5% meadowfoam phosphite adduct[b] | 0.42 | 280 | 4500 |
| Base fluid + 1% meadowfoam oil + 0.5% meadowfoam phosphite adduct | 0.50 | 250 | 4000 |

[a]The sulfurized meadowfoam oil is a mixture of 10 grams of triglyceride meadowfoam oil and 10 grams of jojoba oil sulfurized with 4 grams of sulfur (Run #5 in Table 1).
[b]The meadowfoam phosphite adduct is a monoadduct of dibutyl phosphite with triglyceride meadowfoam oil.

The principles, preferred embodiments, and modes of operation of the invention have been described in the foregoing specification. The invention which is intended to be protected herein, however, is not to be constrained as limited to the particular forms disclosed, since these are to be regarded as illustrative rather than restrictive. Variations and changes may be made by those skilled in this art without departing from the spirit and scope of the invention.

What is claimed is:

1. A lubricant additive comprising a phosphite adduct of triglyceride meadowfoam oil, wherein the phosphite adduct is a mono-, di-, tri-, tetra-, penta-, or hexa-adduct of the reaction product of

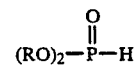

and triglyceride meadowfoam oil, wherein R is selected from the group consisting of H, $C_{1-12}$ alkyl, $C_{1-12}$ aryl, $C_{1-12}$ alkaryl, $C_{1-12}$ aralkyl, and cyclo $C_{4-12}$ alkyl.

2. The lubricant additive of claim 1 wherein R is selected from the group consisting of $C_{4-8}$ alkyl, $C_{4-8}$ alkaryl, $C_{4-8}$ aralkyl, and cyclo $C_{4-8}$ alkyl.

3. The lubricant additive of claim 2 wherein R is n-butyl.

4. The lubricant additive of claim 1 wherein the phosphite adduct point of attachment to triglyceride meadowfoam oil is at a carbon-carbon double bond.

* * * * *